United States Patent [19]

Lasoski

[11] 4,426,452

[45] Jan. 17, 1984

[54] VOLATILE METAL CARBONYL ANALYSIS

[75] Inventor: Bernard A. Lasoski, Mantua, N.J.

[73] Assignee: Syngas Company, Deer Park, Tex.

[21] Appl. No.: 382,571

[22] Filed: May 27, 1982

[51] Int. Cl.³ .................... G01N 31/08; G01N 23/08
[52] U.S. Cl. ........................................ 436/76; 436/84;
 436/153; 436/161; 55/386; 55/72
[58] Field of Search ............... 436/76, 84, 153, 161;
 55/67, 197, 386, 72; 73/23.1

[56] References Cited

U.S. PATENT DOCUMENTS 3,954,413 5/1976 Kucherov et al. .................. 436/76
4,108,552 8/1978 Marshall et al. .................. 356/315
4,115,063 9/1978 Demers ............................. 436/76 X
4,205,956 6/1980 Stedman ............................ 436/84

FOREIGN PATENT DOCUMENTS 700451 11/1979 U.S.S.R. ............................. 436/84

Primary Examiner—Robert A. Yoncoskie

[57] ABSTRACT

The presence of volatile metal carbonyls, e.g., nickel tetracarbonyl and iron pentacarbonyl, in fluid streams can be measured simultaneously by a gas chromatograph using squalane as the stationary liquid phase and a constant current, electron capture detector.

3 Claims, No Drawings

VOLATILE METAL CARBONYL ANALYSIS

BACKGROUND OF THE INVENTION

1. Technical Field

This invention relates to a method of measuring the metal carbonyl content of fluid streams, e.g., syngas or coal gasification process streams, carbon monoxide gas, air, and liquid solutions. The method is useful in detecting and measuring the metal carbonyl content of such streams in parts per billion (ppb).

It is known that some metal carbonyls, particularly iron pentacarbonyl ($Fe(CO)_5$) and nickel tetracarbonyl ($Ni(CO)_4$), act as catalyst poisons in some processes. In others they can react with hydrogen sulfide to form deposits of nickel and iron sulfides thus fouling process equipment. In view of these problems it is advantageous to run processes to minimize the formation of these carbonyls. However, in order to do so, an accurate method for their measurement is required.

U.S. Pat. No. 4,108,552 describes a method for such measurement. In this method a gaseous sample is fed into two separate gas chromatograph columns, one column separates iron pentacarbonyl and the other column separates nickel tetracarbonyl. After separation both carbonyls are detected and measured by flame photometry.

2. Summary of the Invention

The applicant has discovered an improved method of measuring such metal carbonyls.

In this method, first a representative fluid sample is obtained. Then the sample is fed with carrier gas into an on-column glass column in a gas chromatograph. This column operates at 23-40° C., preferably about 31° C., and simultaneously separates the individual metal carbonyls from the sample. Squalane is employed as the stationary liquid phase for the separation. The stream from the gas chromatographic column is then fed into a constant current, electron capture detector where the metal carbonyl content is detected and a signal produced.

The process of the invention has the advantages that the determination and measurement of metal carbonyls can be accomplished quickly, less then ten minutes, and accurately with a lower detection limit of less than one ppb. With such rapid, accurate and sensitive response, the process can be tied into the process involved for control of the reaction to avoid metal carbonyl production. It can also be used to provide a quick reading of the environment for determining worker exposure to the carbonyls.

DETAILED DESCRIPTION OF THE INVENTION

The process of the invention is useful for measuring the volatile metal carbonyl content of air, carbon monoxide, and liquids, as well as the process streams from partial oxidation, syngas and coal gasification processes.

It is particularly useful for detecting and identifying nickel tetracarbonyl and iron pentacarbonyl.

The first step in the method is obtaining a sample of the fluid to be tested. If it is ambient air, carbon monoxide or a liquid, this is usually not a problem. However, obtaining samples from a syngas process can be troublesome in view of the high temperatures and pressures involved. In view of the reactive nature of carbon monoxide with trace levels of iron and nickel under such conditions and the tendency of nickel carbonyl to decompose, an aluminum bomb should be used to collect the sample and the sample thereafter quickly processed, i.e., within twenty-four hours. If a continuous, on-line sampling method is desired, a tantalum valve that is programmed to open with a solenoid every 8-10 minutes could be used.

The sample either in the form of a gas or a liquid solution, e.g., a methanol solution, is fed into a carrier gas. A mixture of 95% by volume argon and 5% by volume methane has been found to be particularly useful, although nitrogen can be used.

The carrier and sample are fed into a conventional gas chromatograph that has an on-column glass column. The flow rate of carrier through the column can range from 15-150 ml/min with a rate of about 70 ml/min preferred.

The sample size of a gas can vary from one ml to as high as 10 ml if lower detection levels are desired. A sample size of one ml can be used to detect nickel tetracarbonyl concentrations between 0.001 and 64 ppm and iron pentacarbonyl concentrations between 0.001 and 27 ppm. The sample size of a liquid can vary from one microliter to as high as 5 microliters if lower detection levels are desired. A sample size of two microliters can be used to detect nickel tetracarbonyl concentrations between 0.001 and 250 micrograms/ml and iron pentacarbonyl concentration between 0.001 and 98 micrograms/ml.

The glass column of the gas chromatograph is packed with a conventional support, e.g., chromosorb W (H/P). However, it is important that stationary liquid phase for the separation be nonpolar squalane (2,6,10,15,19,23-hexamethyltetracosane). The amount of squalane on the support can vary from 5-20% by weight, the larger the amount, the longer the retention time. In most embodiments about 10% by weight is preferred.

The sensitivity and retention time are related to the column temperature employed. The column should be operated with a constant column temperature that can range from ambient (approximately 23° C.) to 40° C. with about 31° C. being preferred for most embodiments.

Under the above conditions, the retention time in the column for nickel tetracarbonyl is about 1.2 minutes and about 8 minutes for iron pentacarbonyl.

The glass column is connected to a constant current, electron capture detector. This conventional device detects the iron pentacarbonyl and nickel tetracarbonyl and produces a signal from which a reading can be made in a suitable recorder.

For instrument standarization, the use of standards in purified nitrogen is preferred.

The following example is an illustration of the process of the invention.

EXAMPLE

Samples are taken in an aluminum bomb of the unshifted syngas stream from a partial oxidation process.

A one ml sample is injected into a Hewlett-Packard gas chromatograph equipped with a linear electron capture detector. The gas chromatograph contains a 6 foot by 4 mm inside diameter (6 mm outside diameter) on-column glass column containing 10% squalane on chromosorb W (H/P) of 80/100 mesh. The one ml sample is injected into the glass column using a gas syringe with a side port needle. The carrier gas of 95% argon/5% methane flows through the column at 70 ml/min.

The column, injection port and detector are operated at a temperature of 31° C.

After a time of approximately 8 minutes, readings are provided of the nickel tetracarbonyl and iron pentacarbonyl content of the sample. Concentrations of these metal carbonyls less than 1 ppb can be detected and identified.

A 2 microliter sample of methanol solution is injected into the gas chromatograph under the same conditions. Approximately 0.001 microgram of each carbonyl per ml of methanol can be detected.

I claim:

1. A method of measuring the volatile metal carbonyl content of a fluid stream comprising, (a) obtaining a sample of the fluid stream, (b) feeding the sample with a carrier stream into an on-column glass column in a gas chromatograph wherein the components of the sample are separated, the column being operated at 23°–40° C. and containing squalane as the stationary liquid phase for separation, and (c) the stream from the glass column feeding into a constant current, electron capture detector where the metal carbonyl content is detected and a signal produced.

2. The method of claim 1 wherein the metal carbonyl is a mixture of nickel tetracarbonyl and iron pentacarbonyl.

3. The method of claim 1 wherein the column injection port and detector are operated at about 31° C.

* * * * *